United States Patent [19]

Peters et al.

[11] Patent Number: 5,231,599
[45] Date of Patent: Jul. 27, 1993

[54] SEMANTIC INTERPRETER FOR AN INCOMING DATA STREAM

[75] Inventors: Daniel G. Peters, Nashua, N.H.; James W. Stonier, Tewksbury, Mass.

[73] Assignee: Bull HN Information Systems Inc., Billerica, Mass.

[21] Appl. No.: 779,146

[22] Filed: Oct. 21, 1991

Related U.S. Application Data

[63] Continuation of Ser. No. 278,861, Dec. 1, 1988, abandoned.

[51] Int. Cl.⁵ .................. G06F 15/417; G06F 7/00; G06F 12/00
[52] U.S. Cl. ............... 364/709.16; 395/400; 395/425; 364/DIG. 2; 364/926.9; 364/928; 364/933.9; 364/938; 364/955.5; 364/956.1; 364/963; 364/963.3; 364/419
[58] Field of Search ... 364/200 MS File, 900 MS File, 364/709.12, 709.16, 419; 341/106; 395/425, 700, 400, 600

[56] References Cited

U.S. PATENT DOCUMENTS

| | | | |
|---|---|---|---|
| 4,241,402 | 12/1980 | Mayper, Jr. et al. | 395/575 |
| 4,330,845 | 5/1982 | Damerau | 395/155 |
| 4,366,551 | 12/1982 | Holtz | 364/419 |
| 4,374,625 | 2/1983 | Hanft et al. | 400/98 |
| 4,475,174 | 10/1984 | Kanayama | 395/425 |
| 4,574,382 | 3/1986 | Ko | 375/25 |
| 4,575,816 | 3/1986 | Hendrickson et al. | 395/775 |
| 4,625,295 | 11/1986 | Skinner | 395/800 |
| 4,763,252 | 8/1988 | Rose | 340/711 |
| 4,783,761 | 11/1988 | Gray et al. | 364/419 |
| 4,866,445 | 9/1989 | Valero et al. | 341/106 |
| 4,987,550 | 1/1991 | Leonard et al. | 364/521 |
| 5,051,947 | 9/1991 | Messenger et al. | 340/146.2 X |

OTHER PUBLICATIONS

C. E. Price, "Table Lookup," *Encyclopedia of Computer Science and Engineering*, 2nd Ed., Van Nostrand Reinhold Co., Inc., 1983, pp. 1479-1486.

*Primary Examiner*—Paul V. Kulik
*Attorney, Agent, or Firm*—Faith F. Driscoll; John S. Solakian; Gerald J. Cechony

[57] ABSTRACT

A controller for controlling a large number of terminals and workstations semantically interprets entering character sequences with little load on its computing power by means of dispatching under the control of a hierarchical arrangement of lookup tables, wherein one possible action that may be dispatched to is the selection of another table in the hierarchy. Characters may thus be interpreted in the context of the characters that have preceded them. Another possible action is to switch to a memory search mode of interpretation, eliminating the need to provide lookup tables for infrequently occurring sequences.

11 Claims, 6 Drawing Sheets

SEMANTIC INTERPRETER FOR AN INCOMING DATA STREAM

This is a continuation of application Ser. No. 07/278,861, filed Dec. 1, 1988 now abandoned.

FIELD OF THE INVENTION

This invention pertains to digital data systems, particularly to digital data systems in which strings of characters may be entered therein, some of which characters may be data characters and some of which characters may be control characters or sequences, and most particularly to the semantic interpretation of such entered strings of characters.

BACKGROUND OF THE INVENTION

References

1. American National Standard ANSI X3.41-1974, "Code Extension Techniques for use with 7-Bit Code Character Set of American National Standard Code for Information Interchange".
2. American National Standard ANSI X3.64-1979, "Additional Controls for use with American National Standard Code for Information Interchange", pp. 12-22.
3. MLX-16 Communications Handbook, Honeywell Bull Inc., Order No. GA02.

Digital data systems generally have provision for strings of characters to be entered therein, some of which characters may be data characters to be stored in the system's memory in order to be retrieved or operated upon at a later time, and some of which characters may be control characters or members of sequences of control characters which are intended to direct the data processing system or to alter its modes of operation. A common example of such character string entry is represented by a keyboard input device at which an operator might enter arithmetic data for subsequent computation, textual data for subsequent incorporation into a document by a word processing program, or control characters that might direct the system as to what operations are to be performed upon the data.

A typical data processing system would have a central processing unit (CPU), which is the primary seat of intelligence in the system; most systems, in the interests of overall efficiency, have lesser centers of intelligence distributed around the system, typically including a "terminal controller" which might effect the low-level interfacing and control of the aforementioned keyboard input devices. A typical terminal controller of the prior art generally has capability to assemble characters in buffer registers and to transmit buffer register characters to the CPU upon assembling a full character set. Further, a typical prior-art terminal controller has the ability to recognize that a control character has just been entered into the buffer register, and to send the buffer register contents to the CPU regardless of whether it is full in order for the CPU to interpret the control character and to take action accordingly, which might include sending instructions back to the terminal controller instructing it to change its mode of operation.

The transmission of control characters to the CPU and subsequent transmission back to the controller represent load on the system and its transmission buses that could be eliminated if the controller could be equipped with sufficient intelligence and memory capacity to interpret control characters without the intervention of the CPU. This loading problem is compounded when a sequence of control characters must be interpreted—there must be a transmission to the CPU and a transmission back after each character of the sequence. The problem is further compounded by the emergent trend to provide "clusters" of terminals, wherein a single controller is called upon to be the interface between the CPU and a large number of terminals—the considerations mentioned above apply to each terminal, and are replicated by the number of terminals.

While these drawbacks of the prior art may be overcome or reduced by providing terminal controllers with more sophisticated hardware and memory capacity, this approach is not desirable because of the expense it would add to the system.

THE PRESENT INVENTION

The present invention overcomes these drawbacks of the prior art by providing a method which enables a terminal controller of relatively low hardware sophistication and memory capacity to perform semantic interpretation of input character strings. The method permits interpretation of entire control sequences so that actions that are directed to be taken locally by the controller can be taken without involving the CPU; the intervention of the CPU need be sought only when a full buffer register character set must be sent thereto, or when the controller has interpreted that the entering character stream has called for an action to be taken by the CPU.

SUMMARY OF THE INVENTION

The method of the present invention employs a hierarchical structure of lookup tables to interpret incoming data streams. A present character of a stream is used directly as an index to a lookup table in order to obtain a branch address, and control is then transferred, according to the branch address, to one of several routines, which may cause an action to be taken locally in the terminal controller, an action to be requested of the CPU, or the selection of another lookup table in the hierarchy for the interpretation of the next character in the stream.

An extension of the method provides for the interpretation of relatively uncommon character sequences without providing entire lookup tables by matching up the sequence with a row of data stored in a memory in order to obtain the branch address.

It is thus a general object of the present invention to provide improved data processing systems.

It is a particular object of the present invention to provide data processing systems in which I/O controllers of low hardware sophistication may interpret incoming data streams.

Other objects and advantages of the present invention will become apparent to those skilled in the art upon studying the ensuing description of the preferred embodiment, and the drawings, wherein:

THE PREFERRED EMBODIMENT

Figure 1:
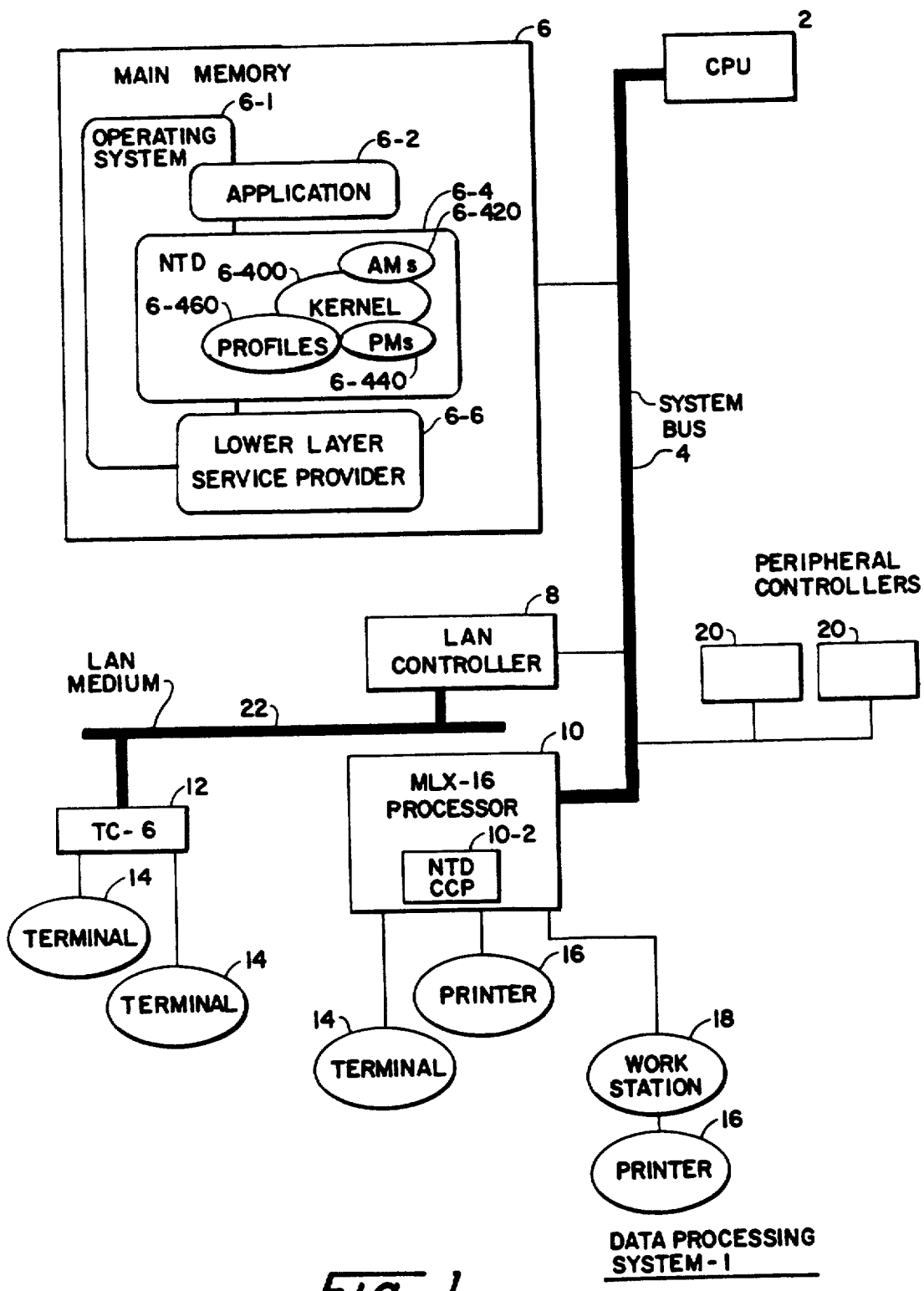
FIG. 1 depicts a complete data processing system in which the present invention is embodied.

FIG. 1 depicts a data processing system 1. A CPU 2 executes programs stored in main memory 6, and communicates with other elements of the system by means of system bus 4. Such other elements may include:

- the LAN controller 8 which controls LAN (local area network) 22 to which one or more TC-6 terminal controllers 12 may be connected, with one or more terminals 14 connected to the terminal controller;
- one or more peripheral controllers 20 for controlling and for providing an interface with peripheral devices such as line printers, mass storage devices, etc.; and
- an MLX-16 processor 10 to which may be connected a "cluster" of terminals 14, printers 16, and work stations 18.

Any of the application programs 6-2 may be used in conjunction with any of the terminals 14, printers 16, or work stations 18. The terminals, printers, and work stations may be of many different types and may use different protocols; the necessary commands and communications with the system bus 4 are provided by NTD 6-4 by means which are discussed fully in patent application Ser. No. 196,597, filed May 20, 1988, assigned to the same assignee as the present application.

Figure 2:
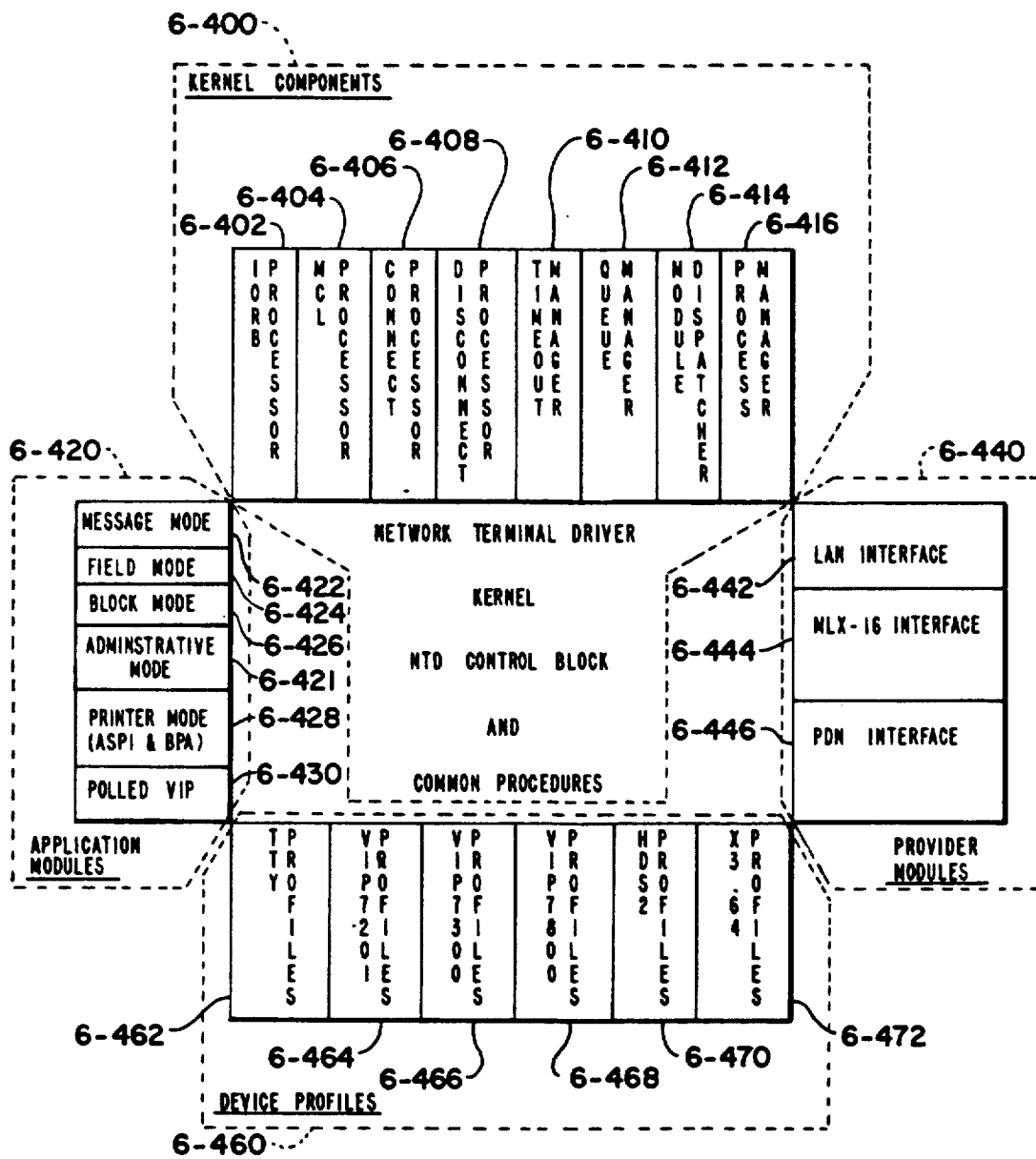
FIG. 2 is a representation of the Network Terminal Driver software of the system depicted in FIG. 1.

FIG. 2 depicts the major components of NTD 6-4. Of particular interest to the present invention are:

- MLX-16 interface module 6-444, which assembles communications to and interprets communications from MLX-16 processor 10 over system bus 4;
- device profiles 6-460, used by the MLX-16 interface module 6-444 for assembling commands and interpreting data streams for each of the various kinds of terminals, workstations, and printers that may be connected to the MLX-16 processor; and
- application modules 6-420, used by the MLX-16 interface 6-444 for interpreting data streams from each device connected to the MLX-16 processor in the context of the device's current mode as specified by the application 6-2 presently utilizing the device.

Figure 3:
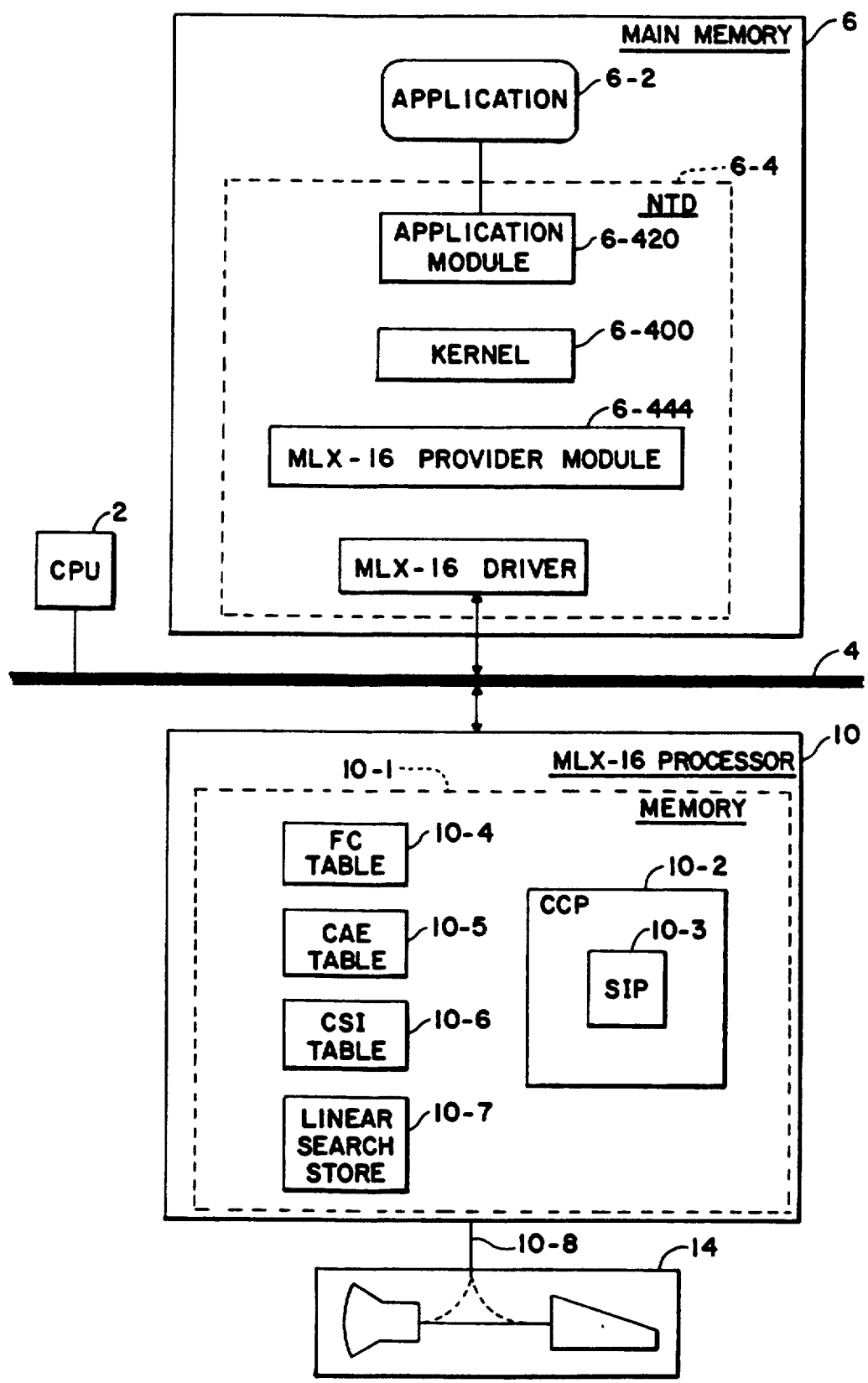
FIG. 3 shows the Semantic Interpreter of the present invention in context within the data processing system.

The present invention is practiced in the MLX-16 processor 10. FIG. 3 shows the MLX-16 processor in its system context. In its memory 10-1 is the Communications Control Program (CCP) 10-2, which includes the Semantic Interpreter Program (SIP) 10-3, and several tables used by the SIP— First Character (FC) table 10-4, Character-After-Escape (CAE) table 10-5, Control Sequence Introducer (CSI) table 10-6, and Linear Search Store 10-7.

As previously discussed, the MLX-16 processor 10 communicates with the applications 6-2 through the NTD 6-4 via system bus 4; MLX-16 driver 7 receives and transmits data in the form necessary for bus transmission. A typical terminal 14 is depicted in FIG. 3, with which the MLX-16 processor communicates via an asynchronous communication line 10-8.

The invention will now be discussed by way of example; it will be assumed that an operator at a terminal 14 inputs the following character stream of twelve ASCII characters, designated 1 through 12:

|    | HEXADECIMAL | ASCII |
|----|-------------|-------|
| 1  | 41          | A     |
| 2  | 43          | C     |
| 3  | 1B          | esc   |
| 4  | 42          | B     |
| 5  | 31          | 1     |
| 6  | 1B          | esc   |
| 7  | 5B          | [     |
| 8  | 43          | C     |
| 9  | 1B          | esc   |
| 10 | 5B          | [     |
| 11 | 3B          | B     |
| 12 | 70          | P     |

With reference to ANSI Standard X3.41-1974 at section 5.3.3.1, it is seen that characters 3 and 4 comprise a "Two-Character Escape Sequence", inasmuch as character 3 is an ESCAPE and character 4 is one of the "final characters" designated in the Standard.

(It should be noted that the referenced ANSI standards do not employ hexadecimal numbers, but rather the decimal equivalents of four-bit groupings. e.g., the left bracket character "[", for which the hexadecimal equivalent of the ASCII code is 5B, is designated in the ANSI standards as being represented by 5/11.)

With reference to ANSI Standard X3.64-1979 at section 3.5, it is seen that characters 6, 7, and 8 comprise a "Control Sequence", inasmuch as: 1) character 6 is an ESCAPE (1/11, or hexadecimal 1B); 2) character 7 is "[" (5/11, or hexadecimal 5B), not one of the "final characters"; and 3) character 8 is one of the final characters. (Note that the sequence esc-[ is designated a "Control Sequence Introducer" (CSI).) It is similarly seen that characters 9-12 also comprise a control sequence.

The assumed incoming character stream, then, may be thought of as comprising six fields:

1. the data character A
2. the data character C
3. the escape sequence esc-B
4. the data character 1
5. the control sequence esc-[-C
6. the control sequence esc-[-9-p The method of the present invention is practiced primarily in Semantic Interpreter Program (SIP) 10-3 which is driven by FC table 10-4, CAE table 10-5, CSI table 10-6, and linear search store 10-7.

For reasons of run-time efficiency, SIP 10-3 makes use of a TABLE LOOKUP (TLU) instruction available in the MLX16 processor 10 (see MLX-16 Communications Handbook). When a current character of the input character stream is provided as an argument to the TLU instruction, the instruction returns a number from an associated table corresponding to the value of the character. (Using 7-bit characters, there being 128 possible values of 7 bits, the associated table must have a length of 128.) In the present embodiment, the returned number is used as an offset into a list of branch addresses to which control is to be passed. A number of subroutines can be provided and their addresses filled in to such a list of branch instructions, resulting in passing control to any of up to 128 subroutines depending on the value of the current character of the data stream.

The present invention employs the table lookup instruction in conjunction with a hierarchical structure of lookup tables to interpret not just data characters, but data streams (that is, to interpret a current character in the contexts of the characters that have preceded it). An extension of the invention allows identification of relatively uncommon character sequences by means of a linear search, which eliminates the need to provide hierarchies of lookup tables for them.

Figure 4A:
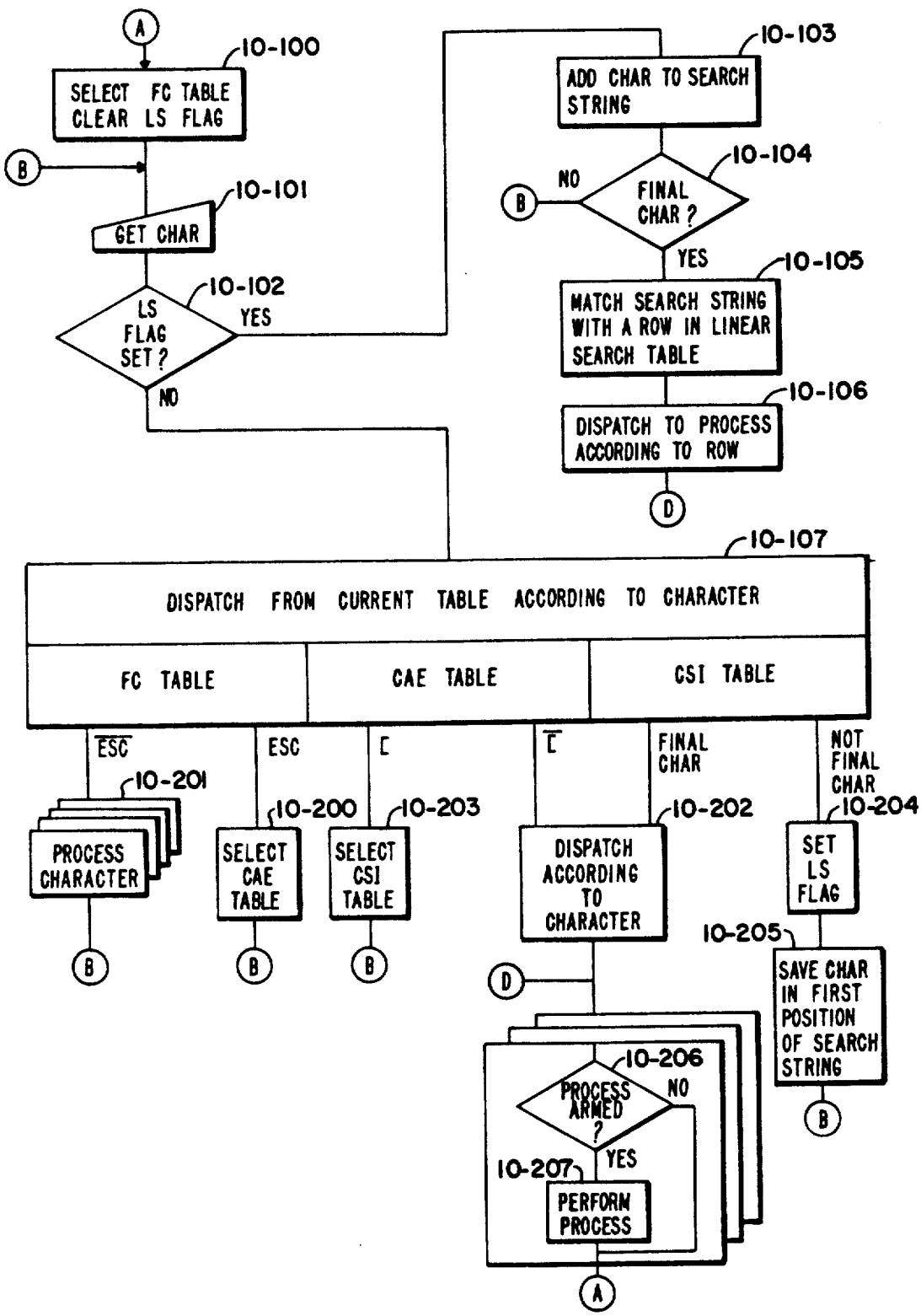
FIGS. 4A and 4B are flow diagrams of the Semantic Interpreter of the present invention.
Figure 4B:
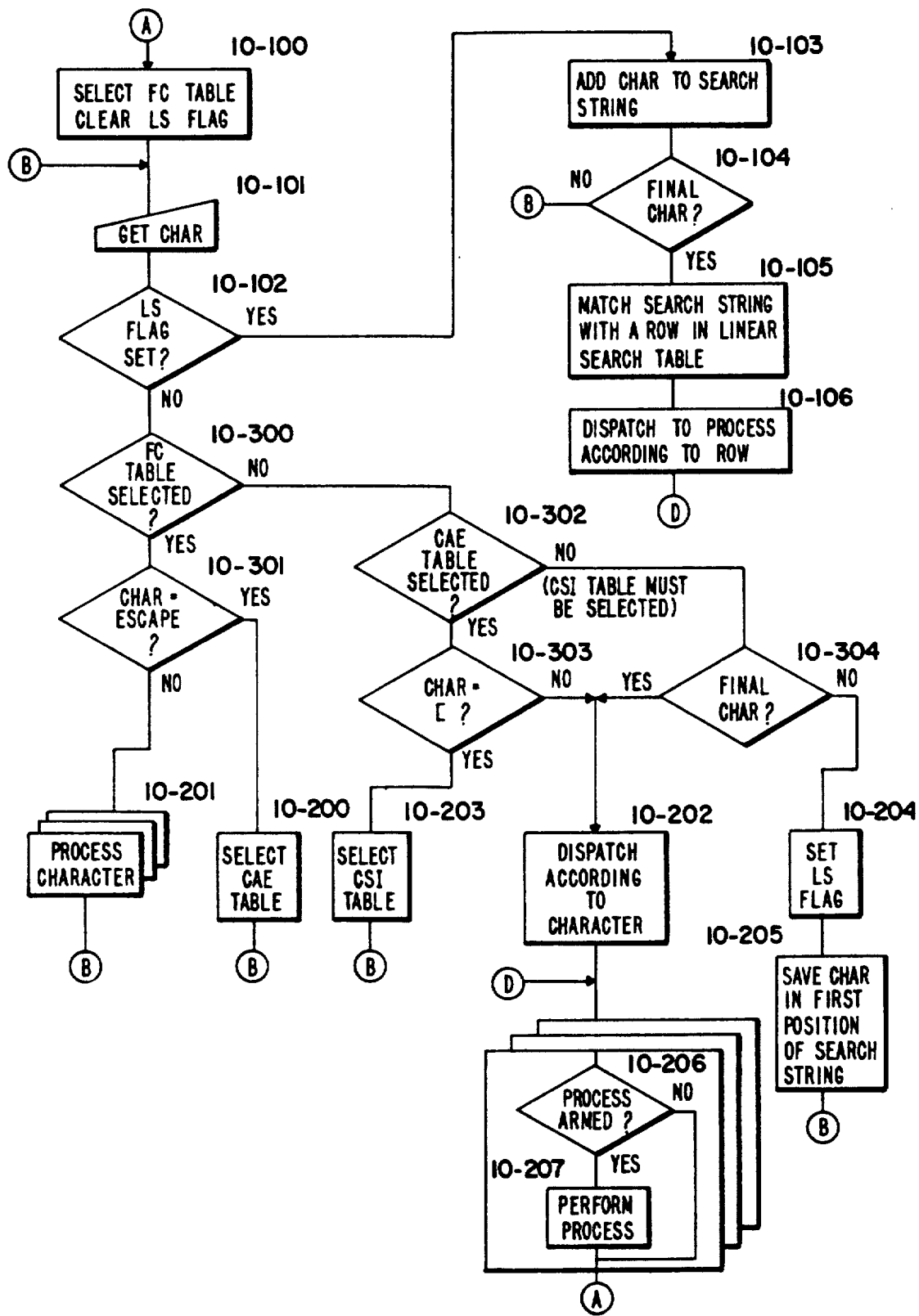

FIG. 4A depicts a flowchart of SIP 10-3, with the TLU instruction being shown as block 10-107. Such a depiction is not fully revealing regarding the logic employed by the program to interpret character streams; therefore, FIG. 4B is provided in the interests of complete disclosure— it is a flowchart of a hypothetical program that would perform precisely the same functions without benefit of the TLU instruction, and which therefore must perform the same logic using conventional tests and branches, well known to those in the art. The ensuing discussion will be based on FIG. 4B, with FIG. 4A being provided for reference only. The discussion will show the handling by SIP 10-3 of the assumed character stream described above.

Data Stream Example

First Character: (A)

The SIP 10-3 is entered at block 10-100, which selects the FC table 10-4 as the "current table" (in actuality, it is selected by associating it with TLU instruction 10-107), and resets the LS (linear search) flag, about which more will be described later. At block 10-101, execution waits entry by the operator of the first character of the stream ("A" in our example). After the A is entered, block 10-102 checks whether the LS flag is set, which it presently is not, so execution "falls through" to block 10-300.

Since the FC table is selected, block 10-300 passes control to block 10-301, which tests whether the present character is an ESCAPE. Since it is not (it is an A in our example), control passes to block 10-201. However, the apparent simplicity of the flow chart is deceiving at this point— control is being passed not merely by a single branch instruction but, as previously described, by using the character to index a 128-position table (FC table 10-4) and obtaining therefrom an offset which in turn determines a branch address. Therefore, although an ESCAPE character in block 10-301 must result in a branch to block 10-200, each of the other 127 possible characters could conceivably branch to a different unique-to-character routine, all represented by block 10-201, which is simply labelled "process character". In the present embodiment, there are only a few routines that can be selected (i.e., there are many replicates among the offsets retrieved from FC table 10-4). All alphanumeric data characters (such as the A of our example) cause branching to a routine that simply stores them in a buffer register, whereas line termination characters (carriage return, line feed, etc.) might cause branching to a routine that not only stores them in the buffer register, but also causes forwarding of the buffer register contents over system bus 4 to main memory 6.

The A of the present example causes a selection that results in storing the A in a buffer, and control passes back to block 10-101 to await the occurrence of the second character.

Second Character: (C)

The second character, being an alphanumeric data character like the first character, would effect repetition of the same processing steps.

Third Character: (esc)

Processing is the same as for the first two characters as far as block 10-301; the offset retrieved from FC table 10-4 corresponding to the ESCAPE character causes branching to a routine that selects CAE table 10-5 (in actuality, associates CAE table 10-5 with TLU instruction 10-107). Control then passes back to block 10-101 to await the fourth character.

Fourth Character: (B)

This is the first character encountered in the example that follows an ESCAPE character, and thus must be handled differently than a B that does not follow an ESCAPE character. This is reflected by the selection, in response to the ESCAPE character, of CAE (character after escape) table 10-5 in lieu of FC (first character) table 10-4, as described above. Thus, processing is the same as for previous characters only as far as block 10-300, which passes control to block 10-302. Block 10-302 dispatches to block 10-303 which, on the basis that the present character is not "[", passes control to block 10-202. (It must be borne in mind that the tests and branches depicted in FIG. 4B are hypothetical constructs, and that this dispatching is actually performed in the present embodiment by TLU instruction 10-107, which indexes CAE table 10-5 with the present character and branches according to the retrieved offset.)

In the present embodiment, escape sequences and control sequences may specify "events" or "signals", where an "event" is defined as an action to be taken locally in the MLX-16 10, while a "signal" is an action to be taken in the CPU 2 (or one of the applications 6-2 running therein). A signal, then, requires a communication over system bus 4, while an event does not. However, the distinction between the two is inconsequential to SIP 10-3; it can dispatch with equal facility to an event-handling routine or a signal-handling routine.

Figure 5:
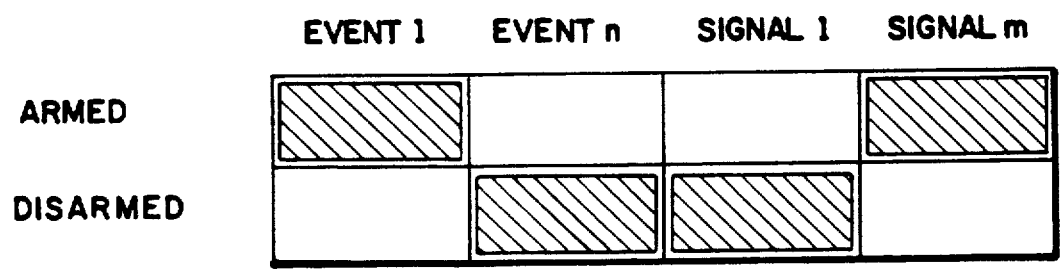
FIG. 5 depicts a scheme employing qualifiers selectively to arm and disarm (enable and disable) events.

The present embodiment allows "qualification", i.e., selective arming and disarming, of each of the events and signals. An array of qualifier bits is associated with the events and signals, one bit for each, as depicted in FIG. 5. Integral to the processing of each event or signal is a check of whether the corresponding qualifier is set or cleared. If the qualifier is cleared, the processing is bypassed— i.e., the event or signal is not performed. Among the events that may be performed are the arming or disarming of signals or other events.

Referring again to FIG. 4B, block 10-202, according to the offset stored in CAE table 10-5 at the position corresponding to the present character (B), branches to one of the routines 10-206 which will determine whether the corresponding process is "armed" by its corresponding qualifier. If it is armed, control passes to block 10-207 which will perform the process (be it an event or a signal) specified by (presently assigned to) the sequence esc-B.

This being the end of a sequence (B is one of the "final characters" as specified in the ANSI standards), the routine 10-206 returns all the way to block 10-100, which, in preparation for a new sequence, selects FC table 10-4. It also clears the LS flag, but that is of no consequence at this point because thus far in the example it has not been set.

Fifth Character: (1)

This is an ordinary data character, so processing will be the same as for the first or second characters.

Sixth Character: (esc)

It is evident that processing of this character is the same as for the third character, which was also an ESCAPE—at the time of return to block 10-101, CAE table 10-5 is selected.

Seventh Character: ([)

Processing will be the same as for the fourth character (which was also a character-after-escape) through block 10-303. In block 10-303, because the present character is [ (i.e., the sequence thus far is a "control sequence introducer" (CSI) as defined in the ANSI standards), control is passed to block 10-203, which selects CSI table 10-6. The flow returns to block 10-101 to await the next character in the sequence.

Eighth Character: (C)

It will be seen that processing will proceed to block 10-302 where, because CAE table 10-5 is no longer selected, processing will transfer to block 10-304. Here, because the present character (C) is one of the "final characters" specified in the ANSI standards, control will be passed through block 10-202 to the process routine specified by the "C" position of character-after-CSI table 10-6 to perform the signal or event assigned to sequence esc-[-C. Again, control passes back to block 10-100 which selects FC table 10-4 in anticipation of the next character or sequence.

Ninth Character: (esc)

As described above in connection with previous ESCAPE characters, block 10-200 will select CAE table 10-5.

Tenth Character: ([)

Processing proceeds as for the seventh character, which was also a [ following an ESCAPE; block 10-203 selects CSI table 10-6.

Eleventh Character: (9)

Processing proceeds as for the eighth character as far as block 10-304 where, because the present character is not one of the final characters specified in the ANSI standards, execution passes (under control of the CSI table 10-6 to block 10-204, which sets the LS (linear search flag), then to block 10-205 which saves the current character for use in linear searching.

With reference to ANSI Standard X3.64 at section 3.5, the current sequence is seen to be a "control sequence" including a parameter. (The previous sequence, consisting of the sixth, seventh, and eighth characters, was a control sequence without a parameter.) In light of the foregoing discussion, one skilled in the art could determine how to construct more tables in the hierarchy for the interpretation of such sequences; however, it was a design choice in the present embodiment not to employ the hierarchical table scheme for such relatively uncommon sequences, but to revert to a linear search of prestored sequences in memory for them.

Block 10-205 returns to block 10-101 to await the next character.

Twelfth Character: (p)

Upon input of the character, block 10-102 dispatches, because the linear search flag is now set, to block 10-103. Block 10-103 adds the character to the search string. Block 10-104 checks whether the current character is one of the "final characters" specified in the ANSI standards. If it were not, control would pass back to block 10-101 on FIG. 4B to await the next character. (This procedure enables the method to handle sequences with any number of parameters.) Because the present character is a final character, execution goes to block 10-105 which matches the present search string (in which, as described above, the sequence 9-p has been saved) with a "row" in linear search table 10-7. The row in which it is found will also contain an offset designating a branch address to the appropriate one of routines 10-206 on FIG. 4B which, as before, will result in performing the corresponding process (be it a signal or an event) if the procedure is "armed" by its corresponding qualifier.

After performing the appropriate processing, control returns to block 10-100, which selects FC table 10-4 and clears the linear search flag, thus preparing for the next data character or the start of the next sequence.

This completes the discussion of the example.

One skilled in the art will appreciate that the method can accommodate a number of different protocols or communications modes, in which the significance of escape sequences and control sequences may vary from one to the other, merely by providing appropriate versions of the tables 10-4 through 10-7 for each protocol or mode, or by providing appropriate versions of the list of branch instructions selected according to the retrieved offset.

The invention may be embodied in yet other specific forms without departing from the spirit thereof. The invention is intended to be embraced by the following claims rather than by the particular embodiment described above.

What is claimed is:

1. In a data processing system, a method of interpreting a stream of characters comprising continuous variable-length sequences of characters for recognition of any certain predetermined sequence of characters, and selection of a corresponding certain predetermined process from a plurality of predetermined processes initiated by control apparatus interpreting the stream of characters; the method comprising the steps of:
   a. providing a plurality of lookup tables, each of the plurality of lookup tables having a number of positions equal to the number of possible values assignable to said characters, each position containing information determinative of a branch address and a plurality of said positions containing identical information;
   b. automatically selecting a first lookup table from the plurality of lookup tables at the start of each new sequence;
   c. identifying a first or next character from the stream of characters by the control apparatus which receives the stream of characters;
   d. processing the identified first or next character by the control apparatus to address a corresponding position in the selected lookup table;
   e. retrieving the branch address information from the corresponding position of the selected lookup table;

f. initiating a procedure identified by the corresponding branch address, wherein the procedure identified by the branch address is one of the procedures of steps g and h;

g. executing a certain predetermined process from the plurality of predetermined processes defined by the character sequence, and returning to step b; or h. selecting another lookup table from the plurality of lookup tables and returning to step c for identifying said next character in the sequence.

2. In a data processing system, a method of interpreting a stream of characters by local control apparatus comprising variable-length sequences of characters, certain characters being predetermined as being sequence termination characters; wherein upon recognition of any certain predetermined sequence of characters, a corresponding certain process of a plurality of predetermined processes is to be executed, the data processing system including a memory associated with the local control apparatus including a plurality of tables, each of a number of said plurality of tables having a number of locations equal to the possible values assignable to said coded characters, each location including information for determining which one of said plurality of procedures is to be executed for performing a corresponding one of said actions and another one of said tables for interpreting sequences of said coded characters whose lengths exceed a predetermined number of characters, said another table organized into rows and columns, wherein each row contains a different certain sequence of characters, one character per column; each row further including data corresponding to each sequence of characters determinative of a branch address; the method comprising the steps of:

a. processing characters of each new sequence and selecting said another table upon determining that the character sequence is not interpretable because of its length during the referencing of said number of tables;

b. retaining in the memory, the first character of a sequence and other characters in said sequence interpreted prior to step a;

c. selecting a next character of the sequence and retaining the next character in the memory;

d. when the next selected character is not one of the sequence termination characters, returning to step c;

e. when the selected character is one of the sequence termination characters, matching the retained characters with a certain one of the memory rows containing the predetermined sequences of characters, obtaining from that row the information determinative of a branch address, determining the branch address, the branch address identifying to the local control apparatus the certain predetermined process, executing a process specified by the branch address by the local control apparatus, and returning to step a.

3. The method recited in claim 1, wherein:
each sequence of characters ends with a character predetermined to be a sequence termination character;
the method further including the following steps i, j and k; and
the procedures initiated as a result of f further including:

i. processing the next identified character of the sequence by said control apparatus and retaining a next identified character in the memory;

j. when the next identified character is not one of the sequence termination characters, returning to step i;

k. when the next identified character is one of the sequence termination characters, matching the retained characters with a certain one of a group of lookup table positions containing predetermined sequences of characters, obtaining from the certain one group of lookup table positions, the information determinative of a branch address, determining the branch address, executing a process specified by the branch address, and returning to step a.

4. In a data processing system including a character-oriented input device for providing a stream of input characters and a controller for controlling the input device, wherein: first certain input characters or sequences of input characters are to be stored in the data processing system; second certain input characters or sequences of input characters identify procedures to be taken locally in the controller or at the input device; and third certain input characters or sequences of input characters identify procedures to be performed elsewhere in the data processing system, a method to be practiced in the controller for interpreting characters or sequences of characters from the input device, the method comprising the steps of:

a. providing a plurality of lookup tables, each lookup table having a number of positions equal to the number of possible characters, each position containing information determinative of a branch address and a plurality of said positions of each lookup table containing identical information;

b. selecting a predetermined first lookup table from the plurality of lookup tables;

c. when an input character is applied to the controller, using the input character as an index into the selected lookup table;

d. obtaining from the selected lookup table a corresponding branch address; and;

e. executing a procedure identified by the corresponding branch address as a result of control signals from the controller, the identified procedure being a one of steps f, g, h, or i, wherein;

f. storing the input character in a local memory and returning to step b;

g. executing locally at the input device or in the controller a certain procedure from a first plurality of predetermined procedures, and returning to step b;

h. signalling a request for a certain procedure from a second plurality of predetermined procedures to be taken elsewhere in the data processing system, and returning to step b; and i. selecting a second lookup table from the plurality of lookup tables, and returning to step c.

5. The method recited in claim 4, wherein each sequence of characters ends with a character predefined to be a sequence termination character; the controller further includes a memory having a table organized into rows and columns, wherein each row contains a different certain sequence of characters, one character per column; each row further includes data corresponding to each sequence of characters for specifying a process to be taken upon recognizing each sequence of characters: the method further including the following steps h, i, and j; when the corresponding branch address has a preestablished value in step c, executing as a result of control signals from the controller step h, wherein:

h. in response to the occurrence of the next character of the input stream, retaining the next character of the input stream in the memory;

i. when the selected character is not one of the sequence termination characters, returning to step h;

j. when the selected character is one of the sequence termination characters, matching the retained characters with a certain one of the memory rows containing predetermined sequences of characters, executing a procedure specified by the information further included in the certain row, and returning to step h.

6. The method of claim 1 wherein executing a certain predetermined process of step g includes the step of transferring a character sequence to the data processing system CPU.

7. The method of claim 1 wherein step h includes the step of selecting another lookup table in response to identification of an ESCAPE character.

8. The method of claim 1 wherein step f of said method further includes step i executing a certain predetermined process from the plurality of predetermined processes and returning to step c wherein said step i further includes the step of storing the identified next character in a local memory.

9. In a data processing system, a method of interpreting a stream of variables comprising contiguous variable length sequences of coded characters wherein upon recognition of any certain predetermined sequence of characters, a corresponding certain specified action of a plurality of predetermined actions is to be performed, the method comprising the steps of:

a. providing a plurality of procedures for performing said plurality of predetermined actions:

b. providing a plurality of lookup tables, each table having a number of locations equal to the number of possible values assignable to said coded characters, each location containing coded information for determining which one of said group of procedures is to be executed for carrying out a specified action and a plurality of said locations of each table containing identically coded information for interpreting said sequences of characters having no more than a predetermined number of characters;

c. selecting a first lookup table at the start of each new character sequence or a next lookup table for processing a next character in the sequence;

d. selecting a first character or a next character of each new character sequence following selection of said first character;

e. indexing into the first or the next lookup table using said first or next character respectively for obtaining information used in designating the procedure for performing the action specified by the character sequence being processed;

f. reading out the information from the corresponding location to be used in designating said procedure;

g. repeating steps b through f for each character for completing the interpretation of the character sequence; and, h. executing the procedure designated in step f for carrying out the action specified by the interpreted sequence.

10. In a data processing system, a method of interpreting a stream of variables comprising contiguous variable length sequences of coded characters wherein upon recognition of any certain predetermined sequence of characters, a corresponding certain specified action of a plurality of predetermined actions is to be performed by a corresponding number of procedures, the method comprising the steps of:

a. providing a plurality of lookup tables, each table having a number of locations equal to the number of possible values assignable to said coded characters, each location containing coded information for determining which one of said number of procedures is to be executed for carrying out a specified action and a plurality of said locations containing identically coded information for interpreting said sequences;

b. selecting a first lookup table at the start of each new character sequence;

c. selecting a first character or a next character of each new character sequence;

d. indexing into the first or a next lookup table using said first or next character respectively for obtaining information used in designating the procedure for performing the action specified by the character sequence being processed;

e. reading out the information from the corresponding location to be used in designating said procedure;

f. executing the procedure designated in step e for carrying out the action specified by the interpreted sequence, said action including:

1. performing the action specified by the interpreted character sequence and returning to step b;

2. selecting a next lookup table and returning to step c for processing the next character in the same sequence;

g. repeating steps b through f for each character for completing the interpretation of the character sequence.

11. In a data processing system, a method of interpreting a stream of characters comprising variable-length sequences of coded characters, certain characters being coded to specify termination of a character sequence defining a certain action of a plurality of actions to be performed by a corresponding plurality of procedures, the data processing system including a memory having a plurality of tables, each of a number of said plurality of tables having a number of locations equal to the possible values assignable to said coded characters, each location including information for determining which one of said plurality of procedures is to be executed for performing a corresponding one of said actions and another one of said tables for interpreting sequences of said coded characters whose lengths exceed a predetermined number of characters, said table being organized into rows and columns wherein each row contains a different certain sequence of characters not interpretable using said number of tables, stored one character per column, each row further including information for designating one of said procedures, said method comprising the steps of:

a. selecting a first table at the start of each new character sequence;

b. identifying a first character and a next character of each new character sequence:

c. indexing into the first or a next lookup table of said number of tables using said first or next character respectively for obtaining said information;

d. reading out the information from the corresponding location to be used in designating said procedure;
e. performing steps a through d for each character based on said information obtained in step d for interpreting a number of said characters of a new character sequence defined when a following character in the new sequence does not specify termination of said sequence indicating that the sequence is not interpretable because of its length;
f. storing in said memory, said number of characters interpreted in step e, the following character and each subsequent character in the sequence until receipt of a character specifying termination of said sequence;
g. matching the characters of said sequence stored in step f with the sequences of characters stored in said rows of said another table for obtaining from one of said rows containing an identical character sequence, information for determining said procedure; and,
h. executing said procedure for performing said action specified by said sequence and returning to step a.

* * * * *